United States Patent [19]
Beaupre et al.

[11] Patent Number: 4,808,309
[45] Date of Patent: Feb. 28, 1989

[54] VARIABLE LENGTH MEMBRANE MODULE

[75] Inventors: Richard F. Beaupre, Enfield, Conn.;
Richard P. Guptill, Pittsburgh, Pa.;
Martin D. Hilmar, Beacon, N.Y.

[73] Assignee: Texaco Inc., White Plains, N.Y.

[21] Appl. No.: 140,516

[22] Filed: Jan. 4, 1988

[51] Int. Cl.$^4$ ............................................. B01D 13/01
[52] U.S. Cl. ........................... 210/321.89; 210/500.23
[58] Field of Search ............ 210/321.6, 321.61, 321.67,
210/321.78, 321.87, 321.88, 321.89, 321.9,
433.2, 500.23

[56] References Cited
U.S. PATENT DOCUMENTS
4,647,539 3/1987 Bach ................................. 210/321.67

Primary Examiner—Frank Sever
Attorney, Agent, or Firm—Robert A. Kulason; James J. O'Loughlin; Vincent A. Mallare

[57] ABSTRACT

This invention provides a variable length membrane module for separation of fluids in solution. The module comprises a series of hollow fiber membranes, a tubing surrounding the series of hollow membranes, an outer steel tube encasing the series of hollow membranes and a pair of nuts arranged to engage the tubing to adjust the length of the hollow fiber membranes to allow proper passage of the fluids therethrough.

12 Claims, 3 Drawing Sheets

VARIABLE LENGTH MEMBRANE MODULE

FIELD OF THE INVENTION

This invention relates to the dehydration of glycols such as ethylene glycol. More particularly it relates to a membrane for effecting separation of water from an aqueous solution containing glycols.

BACKGROUND OF THE INVENTION

As is well known to those skilled in the art, it is possible to remove water from mixtures thereof with organic liquids by various techniques including absorption or distillation. These conventional processes, particularly distillation, are, however, characterized by high capital cost. In the case of distillation for example the process requires expensive distillation towers, heaters, heat exchangers (reboilers, condensers, etc.), together with a substantial amount of auxiliary equipment typified by pumps, collection vessels, vacuum generating equipment, etc.

And, as can be assumed, such operations are characterized by high operating costs, principally costs of heating and cooling—plus pumping, etc. Furthermore, the properties of the materials being separated, as is evidenced by the distillation curves, may be such that a large number of plates may be required, etc. When the material forms an azeotrope with water, additional problems may be present which for example, could require that separation be effected in a series of steps (e.g., as in two towers) or by addition of extraneous materials to the system.

There are also comparable problems which are unique to absorption systems.

It has been found to be possible to utilize membrane systems to separate mixtures of miscible liquids by pervaporation. In this process, the charge liquid is brought into contact with a membrane film; and one component of the charge liquid preferentially permeates the membrane. The permeate is then removed as a vapor from the downstream side of the film—typically by sweeping with a carrier gas or by reducing the pressure below the vapor pressure of the permeating species.

Illustrative membranes which have been employed in prior art techniques include those set forth below in Table I.

TABLE I

| Separating Layer | References |
| --- | --- |
| Nafion brand of perfluorosulfonic acid | Cabasso and Liu, J. Memb. Sci. 24, 101 (1985) |
| Sulfonated polyethylene | Cabasso, Korngold, & Liu, J. Pol. Sc: Letters, 23, 57 (1985) |
| Fluorinated Polyether or Carboxylic Acid fluorides | USP 4,526,948 to Dupont as assignee of Resnickto |
| Selemion AMV blend of Asahi Glass cross-linked styrene butadiene (with guaternary ammonium residues on a polyvinyl chloride backing) | Wentzlaff Boddeker, and a Hattanbach J. Memb. Sci. 22, 333 (1985) |
| Cellulose triacetate | Wentzlaff, Boddeker & Hattanback, J. Memb Sci 22 333 (1985) |
| Polyacrylontrile | Neel, Aptel, & Clement Desalination 53, 297 (1985) |
| Crosslinked | Eur. Patent 0 096 |

TABLE I-continued

| Separating Layer | References |
| --- | --- |
| Polyvinyl Alcohol | 339 to GFT as assignee of Bruschke |
| Poly(maleimide-acrylonitrile) | Yoshikawa et. al. J. Pol. Sci. 22, 2159 (1984) |
| Dextrine - isophorodisocyanate | Chem. Econ Eng. Rev., 17, 34, (1985) |

The cost effectiveness of a membrane is determined by the selectively and productivity. Of the membranes commercially available, an illustrative membrane of high performance is that disclosed in European Pat. No. 0 096 339A2 of GFT as assignee of Bruschke—published Dec. 21, 1983.

This reference discloses separation of water from alcohols, ethers, ketones, aldehydes, or acids by use of composite membranes. Specifically the composite includes (i) a backing typically about 120 microns in thickness, on which is positioned (ii) a microporous support layer of a polysulfone or a polyacrylonitrile of about 50 microns thickness, on which is positioned (iii) a separating layer of crosslinked polyvinyl alcohol about 2 microns in thickness.

SUMMARY OF THE INVENTION

In accordance with certain of its aspects, this invention is directed to a variable length membrane module. The membrane module comprises:

(a) a series of hollow fiber membranes arranged to have fluids pass therethrough and potted together at both ends to be maintained in position, separate and spaced apart from each other;

(b) a tubing arranged to surround said series of hollow fiber membranes over said potted ends;

(c) an outer tube encasing said series of potted hollow fiber membranes and tubing; and (d) a pair of nuts positioned over said outer tube and arranged to secure and seal said series of fiber membranes when turned clockwise and when turned counter clockwise to loosen the seal on said series of fiber membranes to allow them to be stretched taut to have a proper flow of fluid through said fiber membranes and membrane module.

The membranes module series of hollow fiber are maintained taut to allow the desired flow of liquids therethrough. The membrane module may be used in the separation of water from alcohols, ethers, ketones, glycols, aldehydes or acids.

However, in the discussion provided below, the separation of water from glycols will be primarily considered since the same means, i.e., membrane module may be used to separate water from other materials such as ethers and ketones.

DRAWINGS

The present invention and its advantages will be more apparent and clear when considering the drawings in conjunction with the following description and discussion of the invention.

DESCRIPTION OF THE INVENTION

The variable length membrane module includes, as a main passage of feed solution separation, a bundle of hollow fiber membranes of any desired length. As shown in FIG. 3, the hollow fiber membranes (i.e., tubular) are potted together at both ends. By such arrangement, the tubular membranes are maintained together and spaced apart for passage of the feed solution which is generally a glycol solution. More specifically, an aqueous ethylene glycol solution charged to the module.

As in most membrane systems, the present membrane materials undergo appreciable swelling when met by water or various solvents in a membrane process feed stream. Such membrane materials become unusable as membrane fibers in fabricated membrane modules due to sagging and buckling of the fibers in response to the swelling phenomena. Attempts to pot such hollow fibers in modules after they are swollen is difficult due to the incompatability of uncured potting epoxy resins with aqueous solutions. Also, membranes that are potted swollen in modules must be kept wet at all times to avoid rupture caused by shrinkage.

Figure 4:
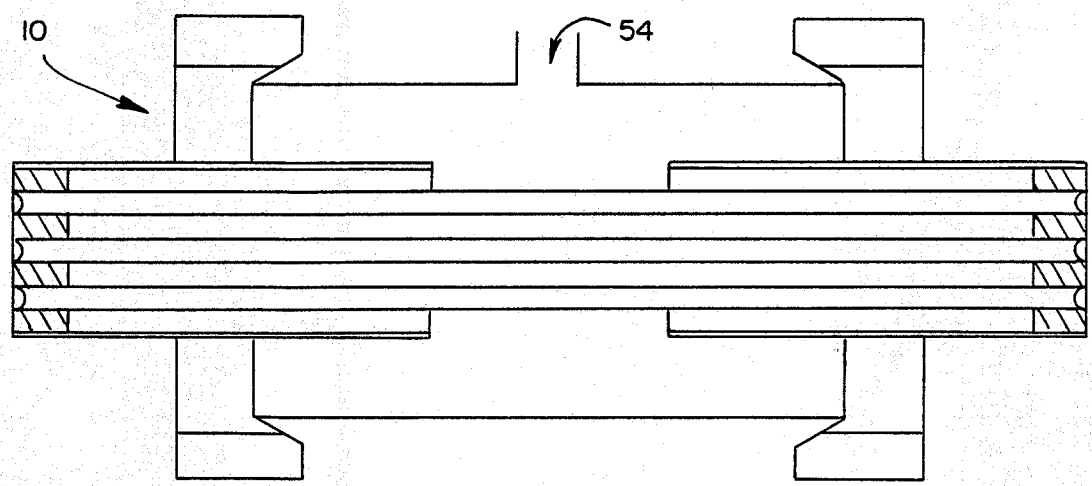
FIG. 4 is an enlarged side view of the present membrane module in operation.

The problem of membrane swelling and fiber elongation has been overcome by development of the present variable length membrane module shown in FIG. 4. The fabrication and operation of such a module enables the experimental evaluation of ionexchange membranes, e.g. made of sulfonated polyethylene, in hollow fiber form, in spite of the fact that the fibers swelled when contacted with the membrane module feed stream.

Figure 1:
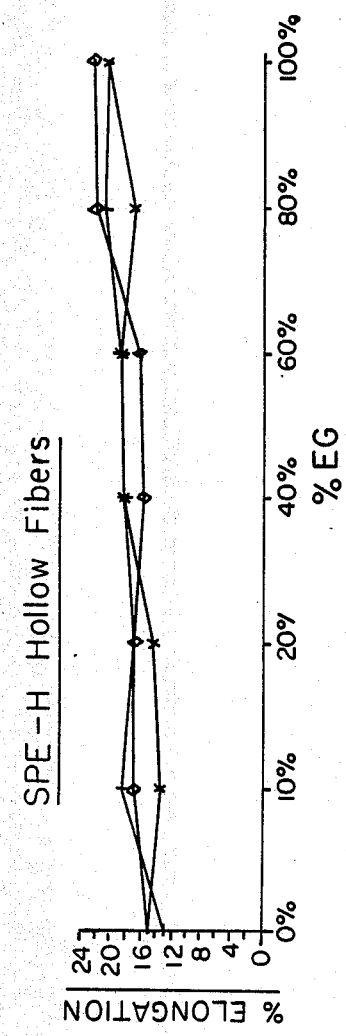
FIGS. 1, 1A, are graphs showing the swelling data of the soaked membrane of the present invention in ethylene glycol solutions at various concentrations and temperatures.
Figure 1A:
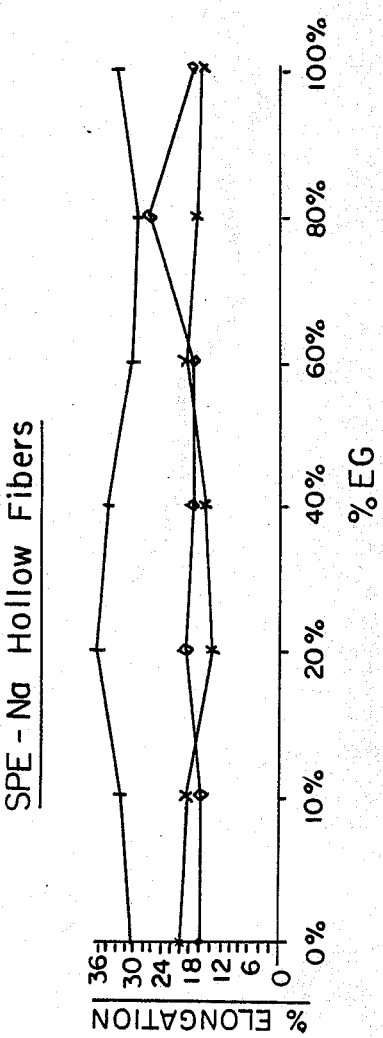

As shown in FIGS. 1, 1A sulfonated polyethylene (SPE) hollow fiber membranes were evaluated for concentrating ethylene glycol/water feed solutions. Swelling data is provided for SPE membranes soaked in ethylene glycol solutions at various concentrations and temperatures. In order to evaluate the SPE hollow fibers, variable length membrane modules were fabricated. The hollow fibers were potted when dry in module end pieces using an epoxy adhesive resin. A coupling connected the module end pieces and served as the middle section of the module shell. The module length was adjusted during experimental runs to allow for the swelling or shrinkage of the membrane hollow fibers. The results of these tests are provided in FIGS. 1, 1A.

The module end pieces in this evaluation were made of nylon tubing and the coupling was made of Tygon tubing. Clamps were used to seal the module shell after length adjustments were made.

Figure 2:
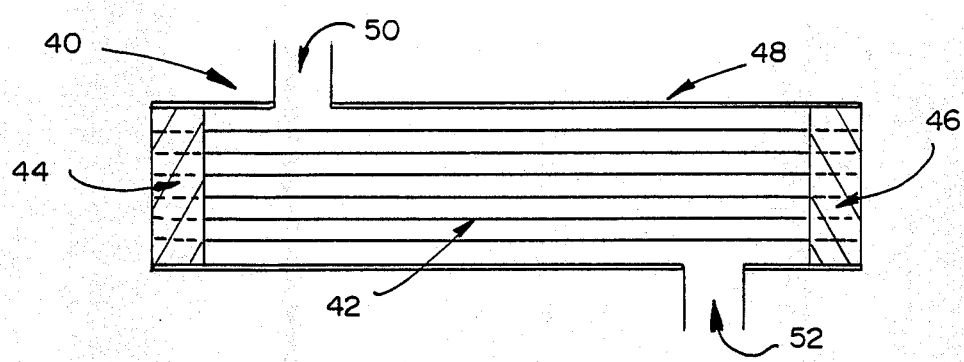
FIG. 2 is a side perspective view of a conventional separation module.

In contrast to the present membrane module (10) of FIG. 4, a conventional known separation membrane module (40) is shown in FIG. 2. The conventional module (40) comprises fiber membranes (42) potted at their respective ends (44, 46) and are positioned in an outer tube (48) which has an air inlet (50), and an air outlet port (52) which also carries the permeate.

In operation, the conventional membrane module (40) is fed a water/glycol mixture and separates the water from the glycol as intended. However, the efficiency and performance of this conventional separation membrane module (40) is not suitable for the needs of present day industry. This is the need fixed by the present membrane module.

Now, according to the present invention, a larger variable length membrane module has been developed for use in organic/aqueous separations. The membrane module is fabricated using a Dresser coupling (Dresser Industries) to seal the module end pieces, as shown in FIG. 4. The length of the module can be adjusted by loosening the Dresser coupling compressor nuts on the module end pieces.

Many hollow fiber membrane materials undergo appreciable swelling when wet. However, as with the present module, such hollow fibers, when potted dry in membrane modules, become unusable as membrane fibers due to sagging and buckling of the fibers in response to the swelling phenomena. Attempts to pot such hollow fibers when wet should not be made since there is an incompatibility of the uncured epoxies with water. But, a coupling such as a style 90 long steel coupling made by Dresser Industries, Inc., may be ueed to fabricate an adjustable length membrane module. According to the present invention, the use of the present variable length membrane module permits the dry potting of the hollow fibers. Thus, the overall membrane module length can be adjusted as the hollow fibers swell or shrink by adjusting the distance between potted ends with the coupling.

Figure 3A:
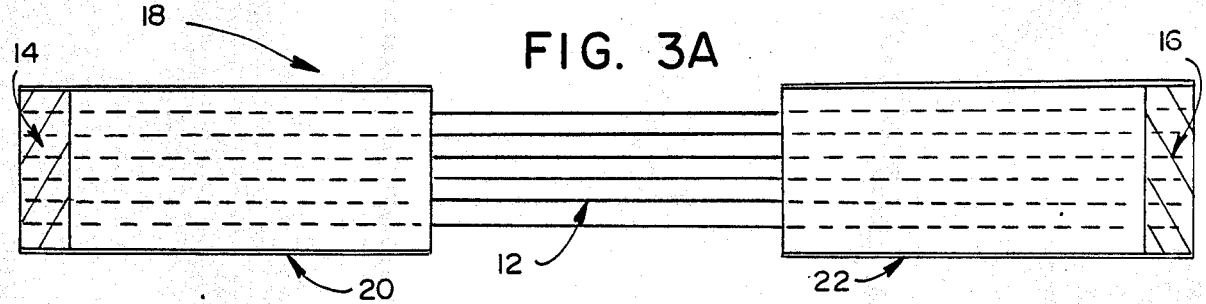
FIGS. 3A, 3B, are side perspective view. of the components of the variable length membrane module of this invention.
Figure 3B:
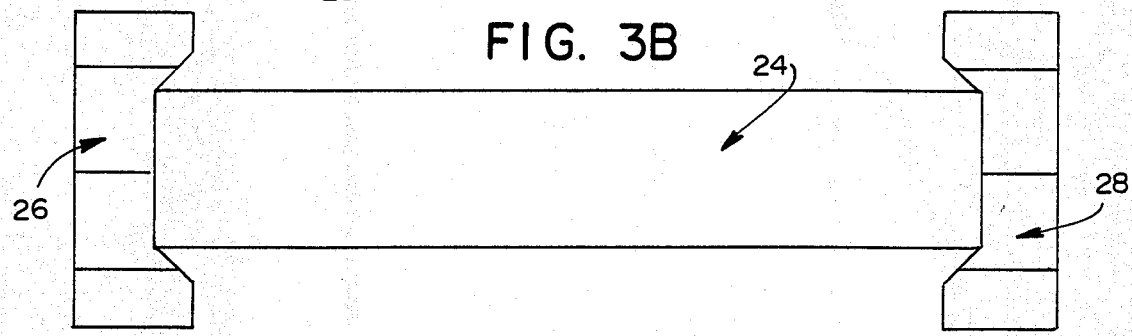

Referring specifically to FIGS. 3A, 3B and 4, the components of the present membrane module (10) are shown and the operation of such, according to the present invention, is illustrated.

As shown in FIGS. 3A, 3B and 4, the module (10) is comprised of hollow fiber membranes (12) which are potted together at their respective potted ends (14) and (16). The fiber membranes (12) are enclosed or covered over their respective potted ends (14, 16) by a tubing (18) which is split in two halves or lengths (20) and (22). The tubing (20, 22) secures and seals the fiber membranes (12) by being pressed by an outer tube (24) encasing the series of fiber membranes (12) and tubing (20, 22). The outer tube (24) is pressed by compressor nuts (26) and (28) when they are turned clockwise. Accordingly, when the compressor nuts (26, 28) are turned "counter" clockwise, the seal and pressure is removed and loosened so that the swelling or sagging fiber membranes (12) may be stretched taut to allow proper passage of fluids therethrough. As in the present case, glycol and water are passed (or fed) through one end of the tubes (12) and separated by the water passing out vacuum port (54) and the enriched glycol continuing through the fiber membranes (12).

The outer tube (24) may be a long dressler coupling as shown in FIGS. 3A, 3B and, the pair of nuts (26, 28) may be compressor nuts that are placed around the outer tube (24) and engage the tubing (20, 22) to compress and loosen such to allow the length adjustment of the hollow fiber tubes (12) to allow proper passage of liquids therethrough.

After the fiber membranes (12) are stretched, then the compressor nuts (26, 28) are turned clockwise to secure and seal the assembly and module so that a separation of water from a, e.g., glycol, can be made.

In the use of the present membrane module, the fiber membranes are preferably sulfonated polyethylene, but may be made of materials selected from the group consisting of sulfonated polethylene, sulfonated polypropylene or Nafion, i.e., a copolymer of polytetrafluorethylene, polysulfanyl and a fluorovinyl ether.

The tubing (20, 22) surrounding the series of fiber membranes (12) may be made of nylon, glass, silicone, polypropylene and the like. This material must be compatible with the materials of which the membranes (12) and outer tube (24), respectively, are made.

As for the outer tube (24), this may be made out of any material that is compatible with that of the tubing (20-22) and fiber membranes (12). The preferred material is steel but the outer tube (24) may be made of a material selected from the group consisting of steel, copper, brass, aluminum or polymeric materials such as polyethylene, polypropylene, polycarbonates and the like.

Figure 5:
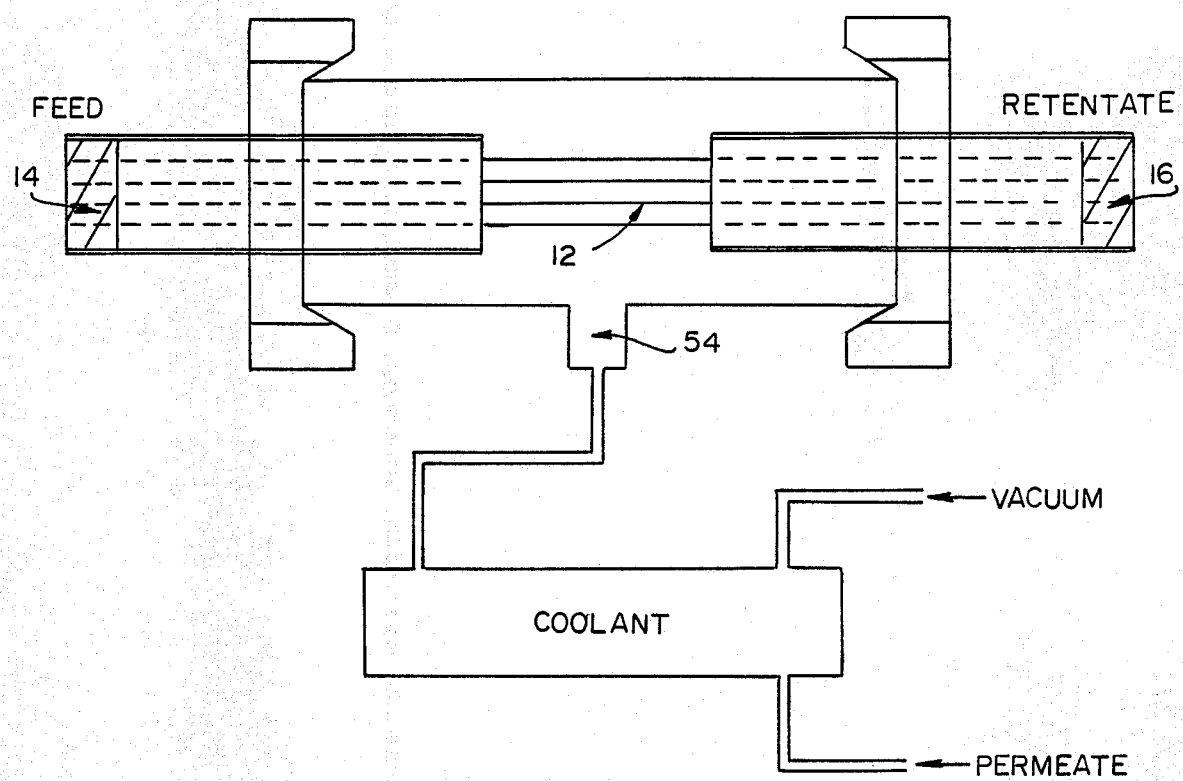
FIG. 5 is a side perspective view of the present module illustrating the vacuum separation process.
Figure 6:
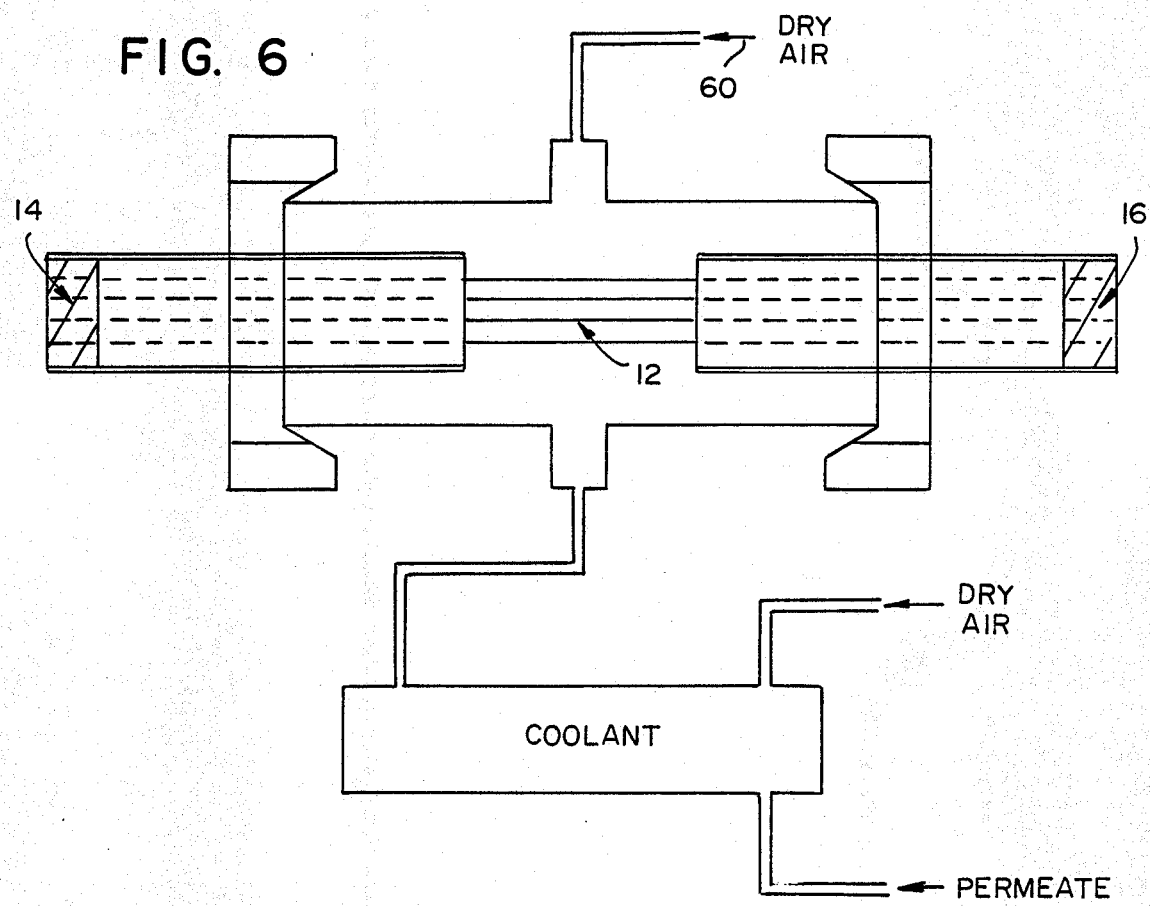
FIG. 6 is a side perspective view of the present module illustrating the dry air separation process.

As shown in FIGS. 5 and 6, there are variations of using the present membrane module (10). FIG. 5 illustrates the embodiment of making the separation by a vacuum process while FIG. 6 shows the separation by a dry air process where air is used to remove the components permeating through the module (10).

Referring specifically to FIG. 5, as the feed (e.g., glycol and water) is passed through the fiber membranes (12) a vacuum pressure is present on the outside of the tubes creating the separation process. This separation is obtained by vaporizing the water from the feed glycol solution through the walls of the fiber membranes (12) and condensing it back to a liquid when it meets the coolant as illustrated in FIG. 5. The remaining enriched glycol feed retentate exits the potted membrane and (16) and returns to the feed reservoir.

In FIG. 6 the dry air separation is shown. In this embodiment, dry air is pumped into the module (10) through air inlet (60) and passes through the module (10) and around membranes (12) to separate the water and glycol as a gas mixture which becomes a liquid when contacting the coolant as shown in FIG. 6. The remaining enriched glycol feed, retentate, exits the potted membrane end (16) and returns to the feed reservoir.

Although this invention has been illustrated by reference to specific embodiments, it will be apparent to those skilled in the art that various changes and modifications may be made which clearly fall within the scope of this invention as outlined in the appended claims.

We claim:

1. A variable length membrane module for separating liquids in solution, said membrane module comprising:
   (a) a series of hollow fiber membranes arranged to have fluids pass therethrough and potted together at both ends to be maintained in position, separate and spaced apart from each other;
   (b) a tubing arranged to surround said series of hollow fiber membranes over said potted ends;
   (c) an outer tube encasing said series of potted hollow fiber membranes and tubing; and
   (d) a pair of nuts positioned over said outer tube and arranged to secure and seal said series of fiber membranes when turned clockwise and when turned counter clockwise to loosen the seal on said assembly of fiber membranes to allow them to be stretched taut to have a proper flow of fluid through said fiber membranes and membrane module.

2. The membrane module of claim 1, wherein the series of hollow tubing are maintained taut to allow the desired flow of liquids therethrough and to be separated.

3. The membrane module of claim 1, wherein said hollow fiber membranes are made of an ion-exchange material.

4. The membrane module of claim 3, wherein said ion-exchange material is selected from the group consisting of nafion, sulfonated polyethylene and sulfonated poplypropylene.

5. The membrane module of claim 4, wherein said ion-exchange material is sulfonated polyethylene.

6. The membrane module of claim 1, wherein said tubing is split in two sections with each section surrounding a respective potted end of said hollow fiber membranes.

7. The membrane module of claim 1, wherein said outer tube is a long coupling.

8. The membrane module of claim 1, wherein said pair of nuts are compressor nuts that are placed around said outer steel tube and engage said nylon tubing to compress and loosen such to allow the length adjustment of said fiber membranes.

9. The membrane module of claim 1, wherein said tubing is made of a material selected from the group consisting of nylon, glass, silicone and polypropylene.

10. The membrane module of claim 9, wherein said tubing is made of nylon.

11. The membrane module of claim 1, wherein said outer tube is made of a material selected from the group consisting of steel, copper, brass, aluminum, polyethylene, polypropylene and polycarbonate.

12. The membrane module of claim 11, wherein said outer tube is made of steel.

* * * * *